United States Patent
Eldredge et al.

[15] 3,674,782
[45] July 4, 1972

[54] INTERMEDIATES AND THE PREPARATION AND USE THEREOF

[72] Inventors: Carl H. Eldredge; John D. Mee, both of Rochester, N.Y.

[73] Assignee: Eastman Kodak Company, Rochester, N.Y.

[22] Filed: Dec. 24, 1968

[21] Appl. No.: 786,759

[52] U.S. Cl. ............................. 260/240.4, 96/101, 96/127, 96/137, 260/240.1, 260/240.8, 260/240.2, 260/251 A, 260/257, 260/260, 260/304, 260/306.7, 260/307 H, 260/307 B, 260/309.5, 260/309.7, 260/310

[51] Int. Cl. ....................................................C09b 23/10

[58] Field of Search ............................ 260/240.2, 240.4, 260

[56] References Cited

UNITED STATES PATENTS 3,436,362  4/1969  Hayer et al. ........................ 260/260 X

FOREIGN PATENTS OR APPLICATIONS 1,240,930  8/1960  France ................................. 260/240.4
887,509  1/1962  Great Britain ...................... 260/240 X
1,034,677  7/1953  France ................................. 260/240.4

OTHER PUBLICATIONS

Hunig, Annalen der Chemie, vol. 574, pages 106 to 121 (1952)
Bordendorf et al., Archiv der Pharmazie, vol. 296, pages 104 to 107 (1963)
Derwent Belgian Report N.D. No. 50, pages 4–5 Group 3, 1965 (abstract of Belgian Patent 660,253)

*Primary Examiner*—John D. Randolph
*Attorney*—W. H. J. Kline, J. R. Frederick and Ogden H. Webster

[57] ABSTRACT

Novel compounds of the formula:

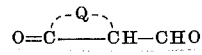

are provided wherein Q represents the non-metallic atoms required to complete an acidic nucleus of the type used in merocyanine dyes. Methods for preparing these compounds, and the preparation of merocyanine and oxonol dyes employing these compounds, are also described.

3 Claims, No Drawings

INTERMEDIATES AND THE PREPARATION AND USE THEREOF

This invention relates to novel reactive dye intermediates, the preparation of these intermediates and to the preparation of merocyanine dyes with such intermediates.

Acetanilidomethylene derivatives of heterocyclic compounds having an alpha-ketomethylene group have been suggested as intermediates for the preparation of merocyanine dyes. However, these intermediates may have poor solubility, and produce dyes in relatively low yields and low states of purity. In our copending application Ser. No. 639,050, filed May 17, 1967, a new class of superior intermediates (as compared to above mentioned prior art compounds) for the preparation of dimethine merocyanine dyes is described. Those intermediates are the dialkylaminomethylene derivatives of heterocyclic compounds having an alpha-ketomethylene group. We have now found that such dialkylaminomethylene compounds can be hydrolyzed to the corresponding aldehydes, and further, that these novel aldehydes are even more efficacious intermediates for the preparation of merocyanine dyes than the dialkylaminomethylene derivatives referred to above. The various advantages of the novel aldehyde intermediates are set forth hereinafter.

It is, accordingly, an object of this invention to provide dye intermediates.

Another object of this invention is to provide dye intermediates which have good solubility and improved reactivity characteristics.

A further object of this invention is to provide a process for preparing the intermediates of the invention.

Still another object of this invention is to provide a method for preparing dimethine merocyanine dyes using the intermediates of the invention.

Other objects of this invention will become apparent from this disclosure and the appended claims.

In accordance with one embodiment of this invention, novel dye intermediates are provided which have the following general formula:

I.

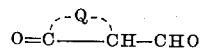

wherein Q represents the non-metallic atoms required to complete an acidic nucleus of the type used in merocyanine dyes, which acidic nucleus preferably contains from five to six atoms in a heterocyclic ring, three to four of said atoms being carbon atoms and two of said atoms being selected from a nitrogen atom, an oxygen atom and a sulfur atom, at least one of said two atoms being nitrogen, such as a 2-pyrazolin-5-one nucleus (e.g., 3-methyl-1-phenyl-2-pyrazolin-5-one, 1-phenyl-2-pyrazolin-5-one, 1-(2-benzothiazolyl)-3-methyl-2-pyrazolin-5-one, etc.), a 2-isoxazolin-5-one nucleus (e.g., 3-phenyl-2-isoxazolin-5-one, 3-methyl-2-isoxazolin-5-one, etc.), an oxindole nucleus (e.g., 1-alkyl-2,3-dihydro-2-oxindoles, etc.), a 2H-pyrido[1,2-a]pyrimidine-2,4(3H)-dione nucleus, a 2,4,6-triketohexahydropyrimidine nucleus (e.g., barbituric acid or 2-thiobarbituric acid as well as their 1-alkyl (e.g., 1-methyl, 1-ethyl, 1-propyl, 1-heptyl, etc.), or 1,3-dialkyl (e.g., 1,3-dimethyl, 1,3-diethyl, 1,3-dipropyl, 1,3-diisopropyl, 1,3-dicyclohexyl, 1,3-di(β-methoxyethyl), etc.), or 1,3-diaryl (e.g., 1,3-diphenyl, 1,3-di-(p-chlorophenyl), 1,3-di(p-ethoxycarbonylphenyl), etc.), or 1-aryl (e.g., 1-phenyl, 1-p-chlorophenyl, 1-p-ethoxycarbonylphenyl, etc.) or 1-alkyl-3-aryl (e.g., 1-ethyl-3-phenyl, 1-n-heptyl-3-phenyl, etc.) derivatives), a rhodanine nucleus (i.e., a 2-thio-2,4-thiazolidinedione nucleus), such as rhodanine, 3-alkylrhodanines (e.g., 3ethylrhodanine, 3-allylrhodanine, etc.), 3-carboxyalkylrhodanines (e.g., 3-(2-carboxyethyl)rhodanine, 3-(4-carboxybutyl)rhodanine, etc.), 3sulfoalkylrhodanines (e.g., 3-(2sulfoethyl)rhodanine, 3-(3-sulfopropyl)rhodanine, 3-(4-sulfobutyl)rhodanine, etc.), or 3- arylrhodanines (e.g., 3-phenylrhodanine, etc.), etc., a 2(3H)-imidazo[1,2-a]pyridone nucleus, a 5,7-dioxo-6,7-dihydro-5-thiazolo[3,2-a]pyrimidine nucleus (e.g., 5,7-dioxo-3-phenyl-6,7-dihydro-5-thiazolo[3,2-a]pyrimidine, etc.), a 2-thio-2,4-oxazolidinedione nucleus (i.e., a 2-thio-2,4(3H, 5H)oxazolidione nucleus)(e.g., 3-ethyl-2-thio-2,4-oxazolidinedione, 3-(2-sulfoethyl)-2-thio-2,4-oxazolidinedione, 3-(4-sulfobutyl)-2-thio-2,4-oxazolidinedione, 3-(3-carboxypropyl)-2-thio-2,4-oxazolidinedione, etc.), a thianaphthenone nucleus (e.g., 3-(2H)-thianaphthenone, etc.), a 2-thio-2,5-thiazolidinedione nucleus (i.e., a 2-thio-2,5-(3H,4H)-thiazoledione nucleus)(e.g., 3-ethyl-2-thio-2,5-thiazolidinedione, etc.), a 2,4-thiazolidinedione nucleus (e.g., 2,4-thiazolidinedione, 3-ethyl-2,4-thiazolidinedione, 3-phenyl-2,4-thiazolidinedione, 3-α-naphthyl-2,4-thiazolidinedione, etc.), a thiazolidinone nucleus (e.g., 4-thiazolidinone, 3-ethyl-4-thiazolidinone, 3-phenyl-4-thiazolidinone, 3-α-naphthyl-4-thiazolidinone, etc.), a 2-thiazolin-4-one nucleus (e.g., 2-ethylmercapto-2-thiazolin-4-one, 2-alkylphenylamino-2-thiazolin-4-one, 2-diphenylamino-2-thiazolin-4-one, etc.), a 2-imino-4-oxazolidinone (i.e., pseudohydantoin) nucleus, a 2,4-imidazolidinedione (hydantoin) nucleus (e.g., 2,4-imidazolidinedione, 3-ethyl-2,4-imidazolidinedione, 3-phenyl-2,4-imidazolidinedione, 3-α-naphthyl-2,4-imidazolidinedione, 1,3-diethyl-2,4-imidazolidinedione, 1-ethyl-3-phenyl-2,4-imidazolidinedione, 1-ethyl-3-α-naphthyl-2,4-imidazolidinedione, 1,3-diphenyl-2,4-imidazolidinedione, etc.), a 2-thio-2,4-imidazolidinedione (i.e., 2-thiohydantoin) nucleus (e.g., 2-thio-2,4-imidazolidinedione, 3-ethyl-2-thio-2,4-imidazolidinedione, 3-(4-sulfobutyl)-2-thio-2,4-imidazolidinedione, 3-(2-carboxyethyl)-2-thio-2,4-imidazolidinedione, 3-phenyl-2-thio-2,4-imidazolidinedione, 3-α-naphthyl-2-thio-2,4-imidazolidinedione, 1,3-diethyl-2-thio-2,4-imidazolidinedione, 1-ethyl-3-phenyl-2-thio-2,4-imidazolidinedione, 1-ethyl-3-α-naphthyl-2-thio-2,4-imidazolidinedione, 1,3-diphenyl-2-thio-2,4-imidazolidinedione, etc.), a 2-imidazolin-5-one nucleus (e.g., 2-propylmercapto-2-imidazolin-5-one, etc.); or a non-heterocyclic acidic nucleus such as cyclohexan-1,3-dione nucleus, e.g., 5,5-dimethylcyclohexan-1,3-dione. The above defined compounds, as previously mentioned, are useful as intermediates for the preparation of various merocyanine dye sensitizers for photographic silver halide emulsions. They have good solubility in media commonly employed in dye synthesis. The subject intermediates are especially useful in synthesizing dimethine merocyanine dyes in a highly pure state, and in excellent yields. In addition, a number of these new compounds are useful for the preparation of desensitizing types of merocyanine dyes which function as electron acceptors and spectral sensitizers for direct positive photographic emulsions. Specific useful intermediates include the 3-formyl-2H-pyrido[1,2-a]pyrimidin-2,4(3H)-diones; the 1,3-dialkyl-5-formyl-2-thiobarbituric acids (alkyl preferably of from one to four carbon atoms); and, the 1,3-dialkyl-5-formylbarbituric acids (alkyl preferably of from one to four carbon atoms). Of these, the pyrimidinediones are especially useful, and are the preferred species of this invention.

The above defined novel dye intermediates of this invention, by reason of the presence of the highly reactive aldehyde group, are particularly useful for the preparation of various merocyanine dyes. The advantages of these novel dye intermediates over previously proposed compounds include:

1. The aldehyde intermediates of this invention allows the use of different reaction conditions for the preparation of merocyanine dyes. For example, the reaction conditions can be more acidic or mildly basic. This is an especially useful characteristic in the preparation of desensitizing dyes because strong bases tend to decompose them.
2. The aldehyde form is more reactive than other intermediates, such as dialkylaminomethylene compounds. In another embodiment of this invention, dye intermediates defined by Formula I above are prepared by hydrolyzing a dialkylaminomethylene compound of the formula:

II.

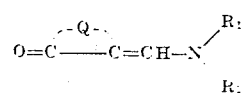

wherein Q is as previously defined, and $R_1$ and $R_2$ each represents an alkyl group, preferably a lower alkyl containing from one to four carbon atoms, e.g., methyl, ethyl, isopropyl, butyl, etc., with an alkali metal hydroxide such as aqueous sodium or potassium hydroxide. Good results are obtained using alkali concentrations of about 0.10 to 5 normal at a temperature of about 5 to 50°C. Reaction is rapid, and frequently hydrolysis is complete within about 5 minutes. After cooling, the solution is acidified with dilute hydrochloric acid and the solid which forms on standing is collected, washed with water and dried. The pure compound represented by Formula I above is obtained by one or more recrystallizations from appropriate solvents such as N,N-dimethylformamide, acetonitrile, methanol, and the like.

The intermediate compounds of Formula II above are prepared by first reacting an inorganic acid halide, such as sulfuryl chloride or preferably, phosphoryl chloride ($POCl_3$) with a dialkylformamide of the formula:

III.

wherein $R_1$ and $R_2$ are as previously defined, to form the "Vilsmeier" complex. Preferably, a relatively large excess of the amide is used, i.e., greater than 1 mol. Formamide per mole of inorganic acid halide. Then, there is added to this mixture a compound represented by the formula:

IV.

wherein Q is as previously defined, preferably in the proportions of approximately 1 mole of the compound of Formula III to each mole of the Vilsmeier complex, followed by heating the reaction mixture, for example on a steam bath, to complete the reaction. After chilling, the solid which forms is separated from the reaction mixture and purified, when desired, by one or more recrystallizations from appropriate solvents such as dimethylformamide alone or from mixtures thereof with methanol.

It will be apparent from the foregoing description and from the examples hereinafter that for the purpose of this invention, the intermediate dialkylaminomethylene compounds represented by Formula II above need not be isolated from their reaction mixtures prior to the hydrolysis step to obtain good yields of the aldehyde intermediate of this invention defined by Formula I above. In this connection, it presently appears that the process of this invention provides the only feasible means for producing the novel aldehyde dye intermediates of the invention, i.e., by hydrolysis of dialkylaminomethylene compounds such as defined in Formula II above. For further details concerning the preparation of the intermediate dialkylaminomethylene compounds that are useful in this invention, reference can be had to our above mentioned copending application wherein such compounds are described and claimed.

In still another embodiment of this invention, a method is provided for the preparation of merocyanine dyes of the formula:

V.

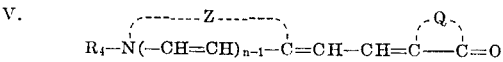

wherein Q has the meaning given above, and $R_4$, Z and n have the values given below, by heating a compound having Formula I above with a compound having the formula:

VI.

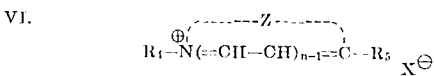

wherein n represents a positive integer of from 1 to 2; $R_3$ represents methyl; $R_4$ represents an alkyl group, including substituted alkyl, (preferably a lower alkyl containing from 1 to 4 carbon atoms) e.g., methyl, ethyl, propyl, isopropyl, butyl, hexyl, cyclohexyl, decyl, dodecyl, etc., and substituted alkyl groups (preferably a substituted lower alkyl containing from one to four carbon atoms), such as a an alkoxyalkyl group, e.g., β-methoxyethyl, ω-butoxybutyl, etc., a carboxyalkyl group e.g., β-carboxyethyl, ω-carboxybutyl, etc., a sulfoalkyl group, e.g., β-sulfoethyl, ω-sulfobutyl, etc., a sulfatoalkyl group, e.g., β-sulfatoethyl, ω-sulfatobutyl, etc., an acyloxyalkyl group, e.g., β-acetocyethyl, γ-acetoxypropyl, ω-butyryloxybutyl, etc., an alkoxycarbonylalkyl group, e.g., β-methoxycarbonylethyl, ω-ethoxycarbonylbutyl, etc., or an aralkyl group, e.g., benzyl, phenethyl, etc., and the like; an alkenyl group, e.g., allyl, 1-propenyl, 2-butenyl, etc., or, an aryl group, e.g., phenyl tolyl, naphthyl, methoxyphenyl, chlorophenyl, etc.; and, Z represents the non-metallic atoms required to complete a heterocyclic nucleus of the type used in merocyanine dyes and containing from five to six atoms in the heterocyclic ring, such as a thiazole nucleus (including a benzothiazole nucleus or a naphthothiazole nucleus), an oxazole nucleus (including a benzoxazole nucleus or a naphthoxazole nucleus), a selenazole nucleus (including a benzoselenazole nucleus or a naphthoselenazole nucleus), a thiazoline nucleus, a 2-quinoline nucleus, a 4-quinoline nucleus, a 3,3-dialkylindolenine nucleus, a 2-pyridine nucleus, or a 4-pyridine nucleus, reference being made to Kendall and Stewart, U.S. Pat. No. 3,128,179, issued Apr. 7, 1964, column 3, line 27 through column 4, line 13, for specific useful examples of the nuclei referred to above, and, preferably, Z can represent the non-metallic atoms required to complete a desensitizing heterocyclic nucleus (defined below) containing from five to six atoms in the heterocyclic ring, such as a nitrobenzothiazole nucleus, e.g., 5-nitrobenzothiazole, 6-nitrobenzothiazole, 5-chloro-6-nitrobenzothiazole, etc.; a nitrobenzoxazole nucleus, e.g., 5-nitrobenzoxazole, 6-nitrobenzoxazole, 5-chloro-6-nitrobenzoxazole, etc.; a nitrobenzoselenazole nucleus, e.g., 5-nitrobenzoselenazole, 6-nitrobenzoselenazole, 5-chloro-6-nitrobenzoselenazole, etc.; an imidazo[4,5-b]quinoxaline nucleus, (as described in Brooker and Van Lare, U.S. Pat. application, Ser. No. 609,791, filed Jan. 17, 1967) e.g., 1,3-dialkylimidazo[4,5-b]quinoxaline such as 1,3-diethylimidazo[4,5-b]-quinoxaline, 6-chloro-1,3-diethylimidazo[4,5-b]quinoxaline, etc., 1,3-dialkenylimidazo[4,5-b]quinoxaline such as 1,3-diallylimidazo[4,5-b]quinoxaline, 6-chloro-1,3-diallylimidazo-[4,5-b]quinoxaline, etc., 1,3-diarylimidazo[4,5-b]quinoxaline such as 1,3-diphenylimidazo[4,5-b]quinoxaline, 6-chloro-1,3-diphenylimidazo[4,5-b]quinoxaline, etc.; and 3,3-dialkyl-3H-pyrrolo-[2,3-b]pyridine nucleus e.g., 3,3-dimethyl-3H-pyrrolo-[2,3-b]pyridine, 3,3-diethyl-3H-pyrrolo[2,3-b]pyridine, etc.; an indolenine nucleus such as a 3,3-dialkyl-3H-nitroindole, e.g., 3,3-dimethyl-5-nitro-3H-indole, 3,3-diethyl-5-nitro-3H-indole, 3,3-dimethyl-6-nitro-3H-indole, etc.; a thiazolo[4,5-b]quinoline nucleus; or a nitroquinoline, e.g., 5-nitroquinoline, 6-nitroquinoline, etc, and, X represents an acid anion (e.g., chloride, iodide, etc.) which may be combined with $R_4$, such as when $R_4$ represents sulfoalkyl.

The dye preparation of the invention described above can be carried out at 100°C. up to about 150°C., and preferably is conducted at reflux in acetic anhydride (about 140°). At such temperatures, reaction is usually complete within about from 1 to 10 minutes. However, lower temperatures can be used with the reaction proceeding more slowly. Intermediates of Formulas I and VI can be present in any suitable concentrations relative to one another, preferably substantially equivalent molar concentrations.

Monomethine oxonol dyes can be prepared in accordance with this invention by reacting a compound of Formula I above with a compound of Formula IV above, preferably at reflux in acetic anhydride.

As used herein and in the appended claims, "desensitizing nucleus" refers to those nuclei which, when converted to a symmetrical carbocyanine dye and added to gelatin silver chlorobromide emulsion containing 40 mole percent chloride and 60 mole percent bromide, at a concentration of from 0.01 to 0.2 grams dye per mole of silver, cause by electron trapping at least about an 80 percent loss in the blue speed of the emulsion when sensitometrically exposed and developed 3 minutes in Kodak developer D-19 at room temperature. Advantageously, the desensitizing nuclei are those which, when converted to a symmetrical carbocyanine dye and tested as just described, essentially completely desensitize the test emulsion to blue radiation (i.e., cause more than about 90 to 95 percent loss of speed to blue radiation). The method of preparing dyes according to this invention is especially useful in synthesis of merocyanine dyes wherein Z in Formula IV above represents the atoms to complete such a desensitizing nucleus. The yield of such dyes is much higher, and the dyes are obtained in a much higher state of purity than when acetanilidovinyl intermediates are employed in the synthesis of these dyes.

The invention is further illustrated by the following examples.

EXAMPLE 1

3-Formyl-2H-pyrido[1,2-a]pyrimidin-2,4(3H)-dione

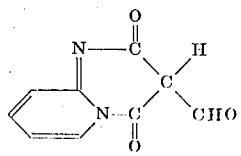

Phosphoryl chloride (3.0 ml., 1 mol. + 10 percent) is added slowly to N,N-dimethylformamide (30 ml.) with ice bath cooling. 2H-Pyrido[1,2-a]pyrimidin-2,4(3H)-dione (4.85 g., 1 mol.) is added and the mixture heated on a steam bath for twenty minutes. After cooling, the mixture containing the intermediate product 3-dimethylaminomethylene-2H-pyrido-[1,2-a]pyrimidin-2,4(3H)-dione is poured slowly into 5N-sodium hydroxide (50 ml.) with vigorous stirring. Ice is added as soon as the reaction became exothermic. This mixture is then acidified with dilute hydrochloric acid. A clear solution is formed, followed by precipitation of a solid, which is collected on a filter funnel, and dried. After one recrystallization from N,N-dimethylformamide, the yield of pure product is 2.85 g. (50 percent, m.p. 277°C. dec.

EXAMPLE 2

1,3-Diethyl-5-formylbarbituric acid

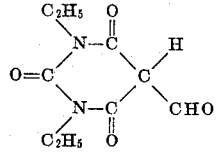

Phosphoryl chloride (3.0 ml., 1 mol. + 10 percent is added slowly to N,N-dimethylformamide (30 ml.) with cooling. 1,3-diethylbarbituric acid (5.52 g., 1 mol.) is added and exothermic reaction occurs. After 5 minutes, the mixture is heated on a steam bath for 10 minutes. After cooling, the mixture containing the intermediate product 1,3-diethyl-5-dimethylaminomethylenebarbituric acid is poured into 5N-sodium hydroxide (50 ml.). The mixture warms by itself and forms a clear solution. After cooling, the solution is acidified with dilute hydrochloric acid. The solid is collected, washed with water and dried. The solid is dissolved in water (50 ml.) containing triethylamine (4.2 ml.), and filtered. The solution is acidified with dilute hydrochloric acid, let stand for one hour. The solid is then filtered off, washed with water, and dried. The yield of pure product is 3.9 g. (61 percent), m.p. 85.5°–87°C.

EXAMPLE 3

1,3-Diethyl-5-formyl-2-thiobarbituric acid

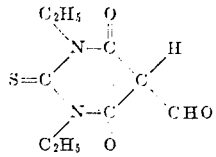

Phosphoryl chloride (30.6 g., 1 mol.) is added slowly to N,N-dimethylformamide (15.4 g. 1 mol. + 5 percent) with cooling. This mixture is added dropwise to a solution of 1,3-diethyl-2-thiobarbituric acid (44.0 g., 1 mol. + 10 percent) in dichloroethane (175 ml.) at refluxing temperature. The mixture is heated at reflux for 5 minutes after completion of the addition, then cooled to room temperature. The solvent is decanted from the sticky residue, concentrated to dryness and the resulting oil (1,3-diethyl-5-dimethylaminomethylenebarbituric acid) is poured into 5N-sodium hydroxide (300 ml.). The solution is stirred for 2 hours, then acidified with concentrated hydrochloric acid. Stirring is continued for 15 minutes, then the solid is collected on a filter funnel. The solid is slurried in water, filtered, and dried. After one recrystallization from acetonitrile and one recrystallization from methyl alcohol, the yield is 9.8 g. (22 percent), m.p. indistinct.

In place of the 1,3-diethyl-2-thiobarbituric acid in the above example, there can be substituted a like molar amount of other 1,3-dialkyl-2-thiobarbituric acids such as 1,3-dimethyl- (or 1,3-dibutyl- or 1-ethyl-3-methyl-, etc.) 2-thiobarbituric acid to give the corresponding 1,3-dialkyl-5-formyl-2-thiobarbituric acid compounds which are likewise useful as intermediates for the preparation of merocyanine dyes. The N,N-dimethylformamide can also be substituted in the above example by a like molar amount of other dialkylformamides defined by Formula III above to give the above mentioned 1,3-dialkyl-5-formyl-2-thiobarbituric acid compounds.

It will also be apparent that any other of the dye intermediates of the invention defined by Formula I above can be readily prepared in accordance with the procedures of above Examples 1 to 3 by appropriate selection of the starting materials. Thus, when Q of Formula II above represents the non-metallic atoms necessary to complete a 3-alkylrhodanine nucleus, this intermediate product on hydrolysis in accordance with this invention yields the corresponding 3-alkyl-5-formyl rhodanine.

The following example illustrates the preparation of a dimethine merocyanine dye employing a preferred dye intermediate compound of this invention.

EXAMPLE 4

3-[1,3-Dimethyl-1H-imidazo[4,5-b]quinoxalin-2(3H)ylidene)ethylidene]-2H-pyrido[1,2-a]pyrimidin-2,4(3H)-dione hydrochloride

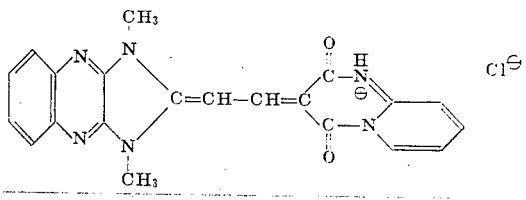

1,2,3-Trimethylimidazo[4,5-b]quinoxalinium p-toluenesulfonate (1.9 g., 1 mol.) and 3-formyl-2H-pyrido-[1,2-a]pyrimidin-2,4(3H)-dione (1.0 g., 1 mol.) in acetic anhydride (15 ml.) are heated at reflux for 1 minute. The reaction mixture is chilled, ether (100 ml.) added, and the solid dye which separates is collected. The crude dye is recrystallized from methanol. Next the dye is dissolved in hot methanol (150 ml.), conc. HCl (5 m.) added, the mixture chilled and the dye collected. Finally, the dye is dissolved in m-cresol and precipitated by the addition of methanol. The yield of purified dye is 0.9 g. (44 percent), m.p.> 310°C.

In place of the 1,2,3-trimethylimidazo[4,5-b]quinoxalinium p-toluenesulfonate in the above example, there can be substituted an equivalent amount of other intermediates such as 6-chloro-1,3-diphenyl-2-methylimidazo[4,5-b]quinoxalinium salt (e.g., the chloride, bromide, iodide, perchlorate, p-toluenesulfonate, etc. salts, etc.); or intermediates such as the 3-alkyl (e.g., methyl, ethyl, propyl, isopropyl, butyl, hexyl, decyl, dodecyl, etc.)-2-methylthiazolium salts (e.g., the chloride, bromide, iodide, perchlorate, p-toluenesulfonate, etc. salts), or the corresponding 3-alkyl-2-methylbenzoxazolium salts, or the corresponding 3-alkyl-2-methylbenzoselenazolium salts, or the nitro substituted intermediates of the above types such as the 3-alkyl-2-methyl-6-nitrobenzothiazolium (or benzoxazolium or benzoselenazolium) salts, and the like, to give the corresponding merocyanine dyes. Also, the 3-formyl-2H-pyrido[1,2-a]pyrimidin-2,4(3H)-dione can be replaced in the above example with any other of the dye intermediates coming under Formula I above to give still other useful dyes of the invention.

As previously mentioned, the dyes which can be prepared using the methods and intermediates of this invention are highly useful sensitizers for photographic silver halide emulsions. Some of these dyes, such as those illustrated by above Example 4 containing a desensitizing nucleus such as an imidazo[4,5-b]quinoxaline nucleus, are particularly useful as electron acceptors and spectral sensitizers for direct positive photographic silver halide emulsions, as disclosed and claimed in copending application of Webster and Heseltine, Ser. No. 639,024, filed May 17, 1967. Other dyes that can be readily prepared in accordance with this invention that function as electron acceptors and spectral sensitizers for direct positive photographic reversal systems include those prepared with intermediates defined by Formula VI above which contain a desensitizing nitro substituent. Typical dyes of this type include the dye 3-[(3-ethyl-6-nitro-2-benzoxazolinylidene)ethylidene]-2H-pyrido[1,2-a]pyrimidine-2,4(3H)-dione, and 3-[(3-ethyl-6-nitro-2-benzoselenazolinylidene)ethylidene]-2H-pyrido[1,2-a]-pyrimidine-2,4-dione, etc.

It will be apparent from the foregoing that other compounds of the invention as defined by Formula I above can be readily prepared by the procedures of the preceding Examples 1 to 3 by appropriate selection of Vilsmeier complexes (Formula III compound plus inorganic acid halide) and reactants of Formula IV above. It will also be apparent that the compounds of the invention are well suited to function as intermediates for the preparation of still other merocyanine dyes.

The invention has been described in detail with particular reference to preferred embodiments thereof, but it will be understood that variations and modifications can be effected within the spirit and scope of the invention.

We claim:

1. A method for preparing desensitizing merocyanine dyes having the formula:

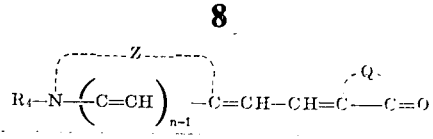

wherein Z represents the non-metallic atoms required to complete a desensitizing nucleus selected from the group consisting of a nitrobenzoxazole nucleus, a nitrobenzothiazole nucleus, a nitrobenzoselenazole nucleus, an imidazo[4,5]quinoxaline nucleus, a 3,3-dialkyl-3H-pyrrolo[2,3-b]pyridine nucleus, a 3,3-dialkyl-3H-nitroindole nucleus, a thiazolo[4,5-b]quinoline nucleus, or a nitroquinoline nucleus; $n$ represents a positive integer of from 1 to 2; $R_4$ represents an alkyl group, a lower alkoxy-lower alkyl group, a carboxy-lower alkyl group, a sulfo-lower alkyl group, a sulfato-lower alkyl group, a sulfoxy-lower alkyl group, a lower alkoxy-carbonyl-lower alkyl group, benzyl, phenethyl, a lower alkenyl group, phenyl, tolyl, naphthyl, methoxyphenyl, or chlorophenyl; and Q represents the non-metallic atoms required to complete an acidic nucleus selected from the group consisting of a 2-pyrazolin-5-one nucleus, a 2-isoxazolin-5-one nucleus, an oxindole nucleus, a 2H-pyrido[1,2-a]pyrimidine-2,4(3H)-dione nucleus, a 2,4,6-triketohexahydropyrimidine nucleus, a rhodanine nucleus, a 2(3H)-imidazo[1,2-a]pyridone nucleus, a 5,7-dioxo-6,7-dihydro-5thiazolo[3,2-a]pyrimidine nucleus, a 2-thio-2,4-oxazolidene nucleus, a thianaphthinone nucleus, a 2-thio-2,5-thiazolidinedione nucleus, a 2,4-thiazolidinedione nucleus, a thiazolidinone nucleus, a 2-thiazolin-4-one nucleus, a 2-imino-4-oxazolidinone nucleus, a 2,4-imidazolidinedione nucleus, a 2-thio-2,4-imidazolidinedione nucleus, a 2-imidazolin-5-one nucleus and a cyclohexan-1,3-dione nucleus, which comprises reacting a compound of the general formula:

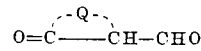

wherein Q has the meaning given above; with a compound having the formula:

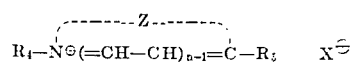

wherein $R_4$, $n$ and Z have the meanings given above; $R_5$ represents a methyl group and X represents an acid anion, the reaction being conducted in a solvent medium under mildly basic to acidic conditions at a temperature from about 100°C. to about 150°C.

2. The method as described in claim 1 wherein said Q represents the atoms necessary to complete a nucleus selected from the group consisting of a 2H-pyrido[1,2-a]-pyrimidine-2,4-3(H)-dione nucleus, a 2-thiobarbituric acid nucleus and a barbituric acid nucleus; and said Z represents the atoms necessary to complete an imidazo[4,5-b]quinoxaline nucleus.

3. The method for preparing 3-[(1,3-dimethyl-1H-imidazo[4,5-b]quinoxalin-2(3H)-ylidene)ethylidene]-2H-pyrido-[1,2-a]pyrimidine-2,4(3H)-dione hydrochloride which comprises heating a mixture of 1,2,3-trimethylimidazo[4,5-b]quinoxalinium p-toluenesulfonate and 3-formyl-2H-pyrido[1,2-a]-pyrimidine-2,4(3H)-dione in acetic anhydride.

* * * * *